Figure 1:
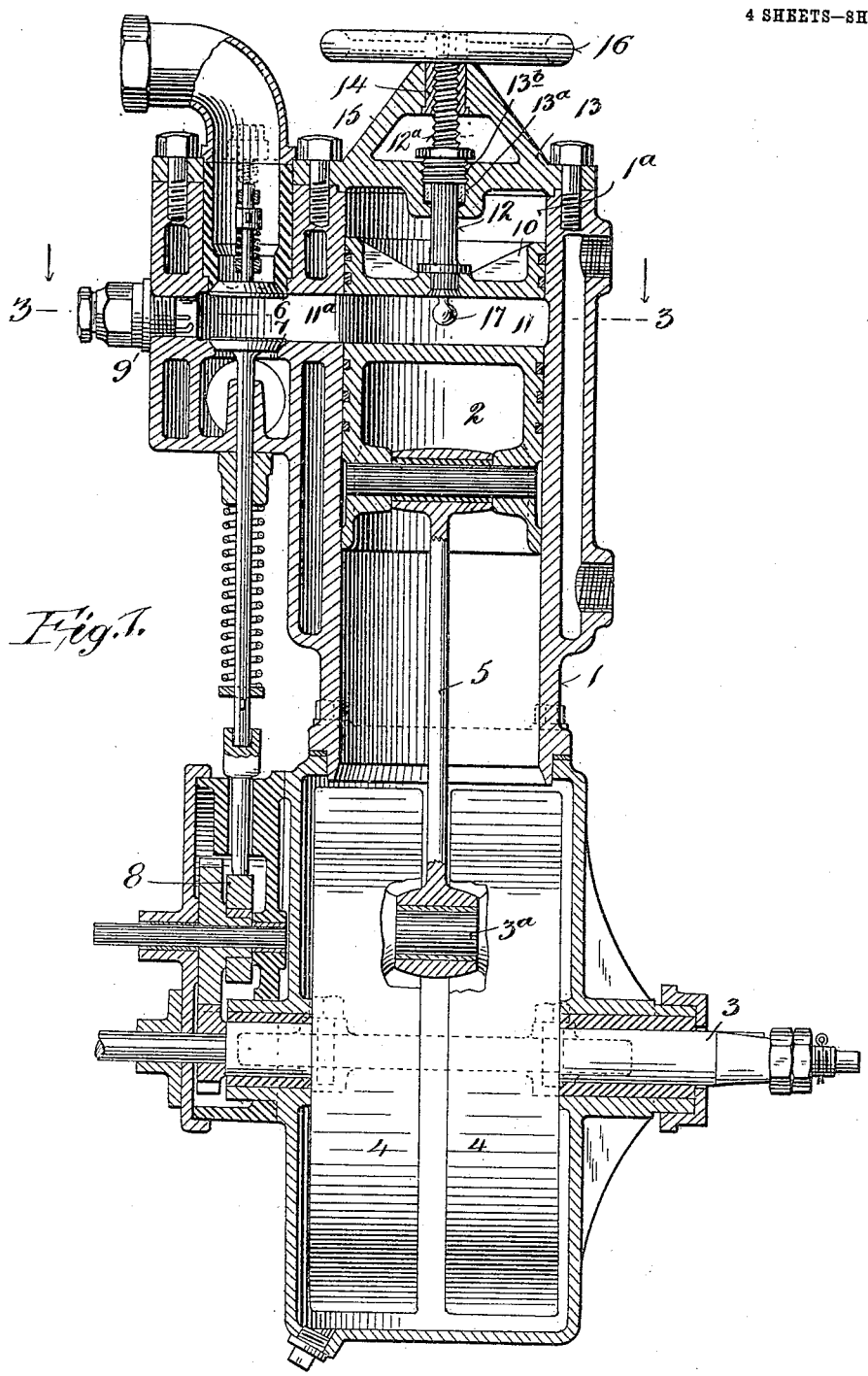

No. 808,336. PATENTED DEC. 26, 1905.
J. L. BOGERT.
INTERNAL COMBUSTION HEAT ENGINE.
APPLICATION FILED OCT. 26, 1904.

4 SHEETS—SHEET 1.

Witnesses
C. W. Benjamin
M. Hollingshead

Inventor
John L. Bogert.
By his Attorney
T. F. Bourne

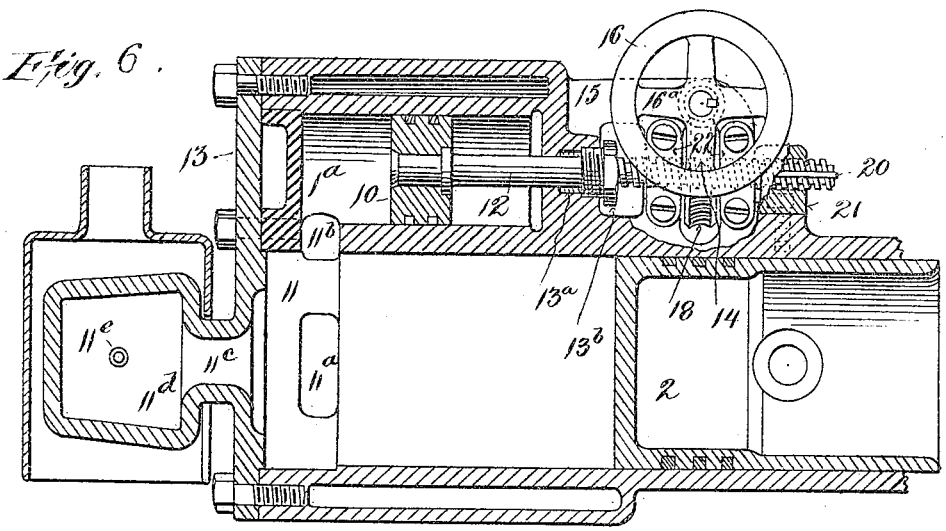
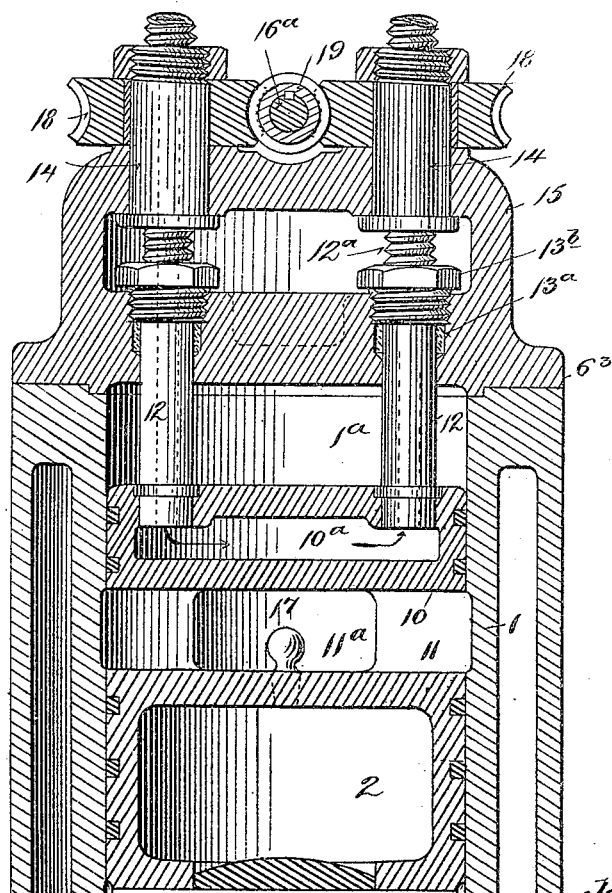

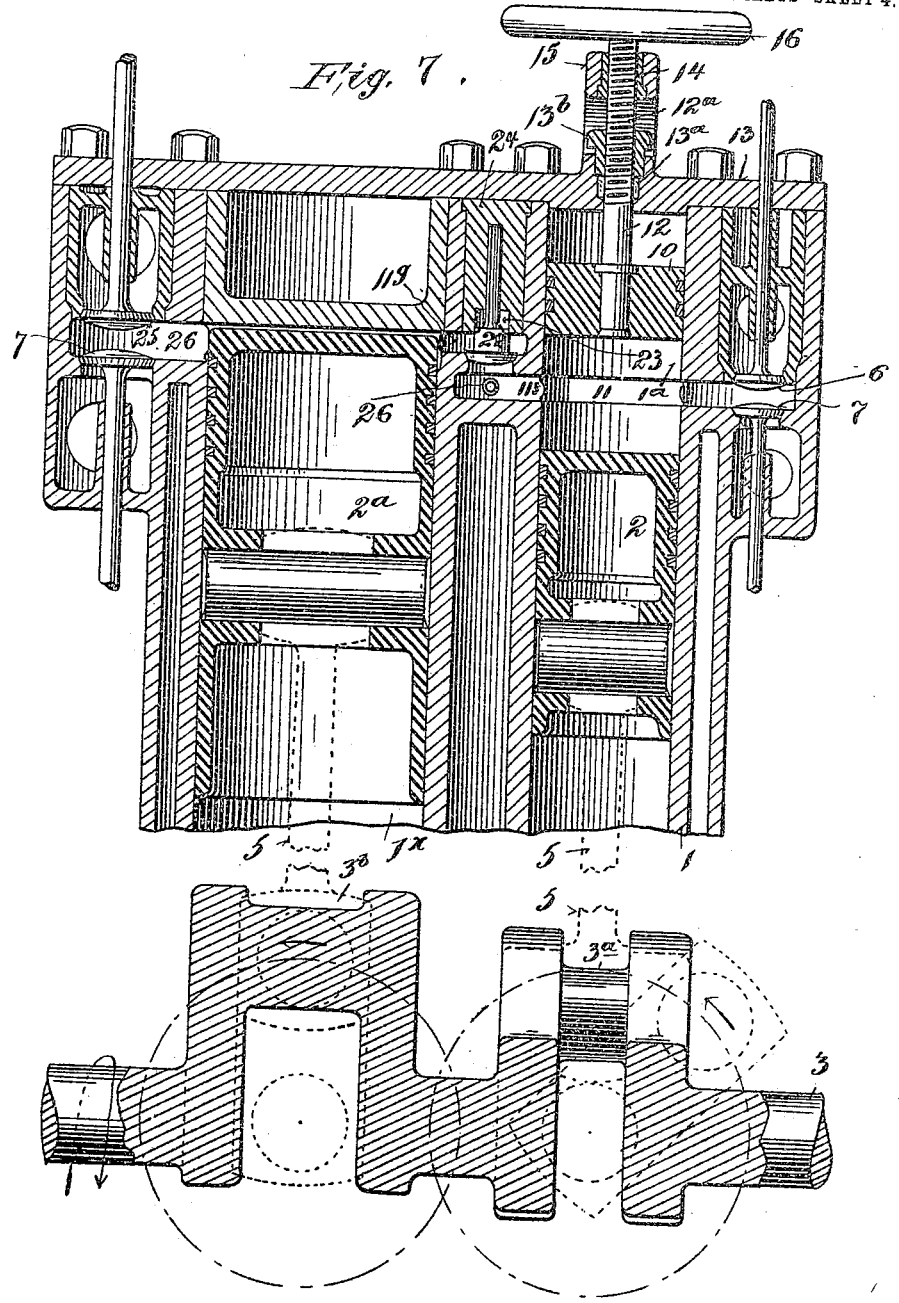

UNITED STATES PATENT OFFICE.

JOHN L. BOGERT, OF NEW YORK, N. Y.

INTERNAL-COMBUSTION HEAT-ENGINE.

No. 808,336.　　　Specification of Letters Patent.　　　Patented Dec. 26, 1905.

Application filed October 26, 1904. Serial No. 230,017.

*To all whom it may concern:*

Be it known that I, JOHN L. BOGERT, a citizen of the United States, residing in New York city, borough of Queens, State of New York, have invented certain new and useful Improvements in Internal-Combustion Heat-Engines, of which the following is a specification.

My invention relates to improvements in the class of internal-combustion heat-engines in which a charge of combustible and air is compressed before ignition.

As theoretically the greatest economy in fuel consumption and the maximum power per volume of working cylinder are obtainable by employing the highest possible compression at the point of ignition, which latter is supposed to take place at the inner dead-point when a reciprocating piston is employed, an unchangeable compression-space is deficient, because a mixture rich in fuel or containing little surplus air will not permit the same degree of compression as a poor mixture or one containing a large surplus of air over fuel. Again, when the walls of the cylinder are cold a higher compression is possible than when hot from the effects of repeated explosions, and hence an engine that is running light or cutting out explosions could employ a higher degree of compression than a heavily-loaded one. Furthermore, the nature of the fuel used also determines the amount of compression possible to be obtained, for, as a rule, gaseous fuels permit much higher compressions than liquid or vaporous ones.

The object, therefore, of my invention is to provide means for varying the compression of the combustible mixture in internal-combustion heat-engines at the will of the operator, whereby advantages hereinafter pointed out may be obtained.

As the majority of internal-combustion heat-engines now used make use of the Beau de Rochas cycle, I have shown in the accompanying drawings devices that may be employed in the construction of four-cycle gas or oil engines; but it will be understood that other cycles employing compression-pressure prior to ignition or inflammation may be used in conjunction with my improvements. Such type of engine is largely employed in automobiles and autoboats, in which engines the speed of rotation of the driving-shaft is commonly high to insure great power for a given weight, often a double stroke of the power-piston occupying but a twentieth of a second. Now as a sensible amount of time is required for the propagation of the flame it is customary to advance the spark as the speed of piston reciprocation increases more and more until ignition of the charge takes place considerably before the piston has reached its inner dead-point. For this reason the pressure of compression is considerably lower when the spark passes between the terminals than it would be if ignition took place at the exact dead-point, and as thorough inflammation of the charge is more rapid in proportion to the compression produced by reducing the compression-space as the speed increases the best results may be obtained. Also when the admission of the fuel mixture is throttled a smaller compression-space may be employed, because the quantity of mixture to be compressed is much smaller, and when starting an engine by hand if the compression-space is relatively small it is difficult to force the piston against the resulting pressure of compression. Hence an increase in the size of the compression-space because of the decreased resulting pressure of compression would facilitate the starting of the engine. My improvements, therefore, are designed to effect the advantages comprehended in the foregoing, and to this end I provide an adjustable piston in a space or chamber that is in communication with the compression-space of the main driving-piston, whereby the effective compression-space is variable at will.

Reference is to be had to the accompanying drawings, forming part hereof, wherein—

Figure 2:
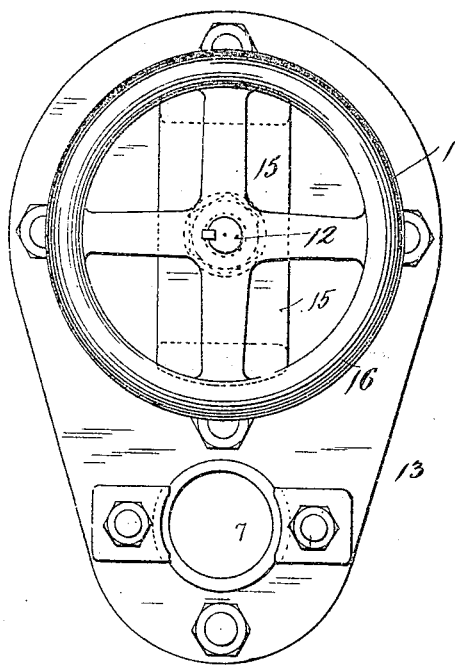
Figure 3:
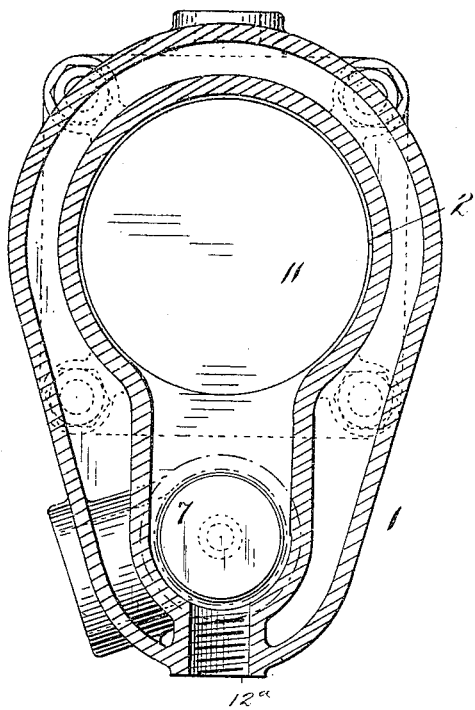
Figure 4:
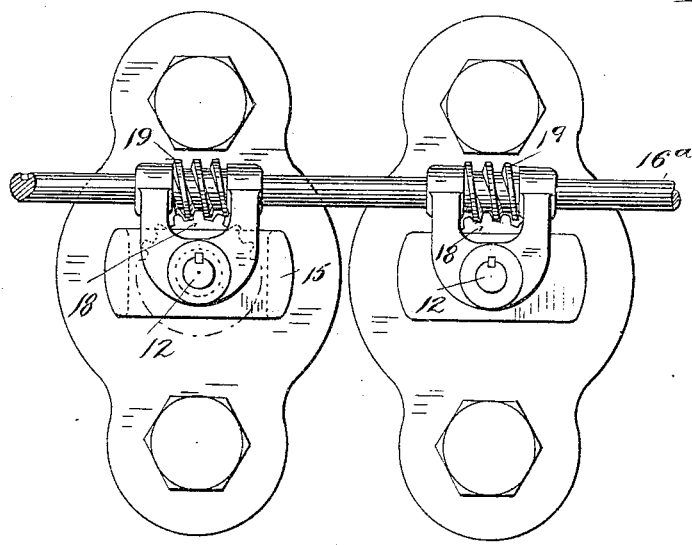

Figure 1 is a vertical section of a well-known type of vertical internal-combustion heat-engine provided with my improvements. Fig. 2 is a plan view of Fig. 1. Fig. 3 is a horizontal section on the line 3 3 in Fig. 1. Fig. 4 is a plan view showing means for simultaneously varying the compression-spaces of a plurality of cylinders in an engine. Fig. 5 is a vertical section showing means for cooling and operating the variable-compression piston. Fig. 6 is a vertical section through the cylinder and vaporizer of a horizontal engine of the well-known Hornsby-Akroyd type provided with my improvements, and Fig. 7 is a central section of an engine in which two cylinders are employed to utilize the force of the expanding gases.

Similar numerals of reference indicate corresponding parts in the several views.

In the drawings the numeral 1 indicates an engine-cylinder; 2, the power-producing piston; 3, the crank-shaft, having cranks which in Fig. 1 are shown formed like fly-wheels 4, 5 being the connecting-rod between the piston and crank, 6 the fuel-intake valve, 7 the exhaust-valve, and 8 the mechanism for operating the exhaust-valve from the driving-shaft 3, and 9 a spark-plug in communication with the compression-space. As all of the foregoing parts are usual in internal-combustion heat-engines, they need no further description and may be of any desired form and construction.

At 10 is indicated my variable-compression piston, shown in Figs. 1, 5, and 7 as located within a prolongation $1^a$ of the cylinder 1 in line with the piston 2, the chamber $1^a$ thus formed being in communication with the compression-space 11, that communicates, through port $11^a$, with the intake and exhaust valves 6 7. The variable-compression piston 10 is shown provided with usual packing-rings and is caused to be adjusted within its chamber $1^a$ toward and from piston 2 by means of rod 12. The said rod 12 is shown passing through a stuffing-box $13^a$ and gland $13^b$ in the cylinder-head 13, said rod being shown threaded for a portion of its length at $12^a$, the threads meshing with a nut 14, carried by a support 15 on the cylinder-head, a hand-wheel or the like 16 being keyed fast to the upper end of rod 12. When the power-piston 2 advances on the suction-stroke, the mixture of air and fuel is drawn past the air-valve 6 through port $11^a$ into compression-space 11 and follows the outward motion of the piston, thus filling the working volume of the cylinder 1, and the return stroke of the piston compresses this charge within the space between the inner face of the power-producing piston 2 and the opposed inner face of the variable-compression piston 10, the port $11^a$ being at the same time filled with a portion of this more or less highly compressed mixture, and when a spark is passed between the inner terminals of the igniter 9 the ignition of the fuel and air takes place, the pressure within the compression-space rapidly rising and the power-stroke of the piston ensuing. It will now be evident that by screwing inwardly the variable-compression piston 10 more or less toward the power-producing piston 2 the compression-space will be proportionately reduced in volume, and hence the compression-pressure will be raised, and likewise by adjusting the variable-compression piston 2 outwardly or away from piston 2 the compression-space will be increased in volume, and hence the compression-pressure will be reduced. By means of said variable-compression piston 10 the volume of the compression-space may be so adjusted that the fuel mixture will explode when the inner dead-point of the piston 2 is reached even if the sparker fails to operate, and especially is this the case if one or more metallic projections are interposed into the compression-space, such as indicated at 17. In this class of engines it frequently occurs that where the load on the engine is heavy and explosions are taking place every second outstroke of the piston there is such an accumulation of heat that premature ignition takes place, and the charge is ignited too soon. By varying the compression-space by means of piston 10 and cutting out explosions the temperature may be reduced. It will thus be understood that by means of the variable-compression piston 10 the volume of the compression-space for the explosive mixture may be readily varied at will, whereby to regulate the power and speed of the engine, thereby enabling the operator to utilize the advantage of the highest compression-pressure or a relatively low compression-pressure, as may be desired and in accordance with the work to be done. By adjusting the piston so that the compression causes the fuel mixture to explode spontaneously when the compression-pressure reaches the highest point possible, whereby to produce explosion or inflammation, the ignition devices need not then be depended upon, and likewise by greatly increasing the compression-space by moving the piston 10 away from piston 2 starting of the engine can be accomplished with greater ease and less powerful explosions will result, and between these two limits any desired degree of compression may be obtained by correspondingly adjusting piston 10 toward or from piston 2.

Where it is desired, water-jacketing may be applied to the variable-compression piston 10. An arrangement for this purpose is shown in Fig. 5, wherein two hollow or tubular piston-rods 12 are used and which communicate with a water-space $10^a$ in piston 10, the outer ends of which tubular or hollow rods may be connected with the water-circulating system of the engine by flexible hose to permit adjustment of piston 10. The stuffing-box, glands, and nuts are shown made in duplicate to accord with the two hollow piston-rods 12, and I have shown one piston-rod 12 provided with right-hand threads and the other with left-hand threads, said rods being fixed to the piston 10. In this case the nuts 14 rotate in bearings in the yoke or support 15, and to said nuts are secured worm-wheels 18, that mesh with a common worm 19, which is keyed to shaft $16^a$ to be rotated by hand-wheel 16, all in any suitable manner, (wheel 16 not being shown in Fig. 5.) Thus when shaft 20 is rotated the two rods will be simultaneously moved to adjust piston 10 to the desired distance within chamber $1^a$. In Fig. 5 the metallic projection 17 is shown attached to piston 2. The metallic projection 17 serves as an igniter when hot, but tends to limit the amount of compression possible with some fuels, as such projection attains a higher temperature than the walls of the compression-space.

As multicylinder engines are extensively used, I have in Fig. 4 shown means for simultaneously varying or altering the compression-space of a number of cylinders. In this figure I have shown engines with double valve-ports, the exhaust-valves being on one side and the air and fuel valves on the other; but my improvements are applicable to any known type of engine of the class described. In said figure the hand-wheel shaft $16^a$ is shown provided with worms 19, meshing with worm-wheels 18, secured to shafts 12 in manner similar to Fig. 5, which cause the piston-rods 12 and their variable-compression pistons 10 to move up or down to an equal extent at the will of the operator. If desired, in an automobile the same handle or hand-wheel may be employed to advance the spark and operate the rod or rods 12 of the piston or pistons 10 to alter the compression in the cylinder or cylinders simultaneously, though preferably these adjustments should be separate.

From the foregoing description it will be understood that my improvements may be applied to a gas or oil engine of any well-known construction wherein the end of a cylinder is not utilized as a valve-case or a vaporizer without material alteration in design. In engines employing the end of the cylinder for supporting or containing valve-case or vaporizer or spark-plug it will be obvious that they may be placed to one side of the cylinder end to accommodate the piston 10, or the piston 10 may be placed in a chamber at one side of and communicating with cylinder 1, so as not to disturb the position of the valves, vaporizer, and ignition devices. Such an arrangement is illustrated in Fig. 6, and in this particular illustration I have shown my improvements adapted to that large class of engines in which for some reasons it is important that the cylinder-head should be employed for another purpose. For this example I have illustrated the well-known type of engine of which the Hornsby-Akroyd is a representative, because the principal difficulty with this type of engine is most effectively cured by means of my improvements. In said figure the chamber $1^a$ is formed on one side of cylinder 1 and may be water-jacketed, and said chamber communicates by a port $11^b$ with the compression-space 11, the port $11^a$ communicating with the exhaust and inlet valves. In this case the constricted passage $11^c$ opens through the cylinder-head 13 from the compression-space 11 into the vaporizer $11^d$, whose walls are kept constantly hot at starting by means of the lamp or the like and afterward by the action of the internal combustion, the oil being pumped into the vaporizer $11^d$ through the inlet $11^e$, the design being to keep the walls of the vaporizer not too hot, but just hot enough to fire the charge at the inner dead-point of the driving-piston 2, the liquid fuel being pumped into the vaporizer in just the proper quantity through inlet $11^e$. This engine gives excellent results when the load does not vary much; but if it is overloaded the walls of the chamber $11^d$ get hotter and hotter until premature ignition takes place and the engine stops, or if the load is reduced greatly the infrequency of the explosions or the reduced richness of the mixture permits cooling down of the walls below the temperature at which ignition will take place. It will therefore be readily understood that if the compression-space 11 or any spaces communicating with it are varied in volume more or less air will be forced into the vaporizer $11^d$ before the inner end of the stroke of the piston 2 is reached, also that the temperature will rise with the compression. Therefore by means of my improved variable-compression piston 10 the quantity of air that may be forced into the vaporizer $11^d$ on the compression-stroke of piston 2 may be varied to meet the conditions arising under changes of load and otherwise to cause the more constant proper explosions to occur more regularly, whereby to prevent premature ignition from taking place and also to prevent cooling down of the walls of the vaporizer below the temperature required to produce ignition of the charge. It will thus be understood that any mechanical means for increasing or decreasing at will, while the engine operates, the volume of the compression-space other than by the reciprocating motion of the power-producing piston or pistons is within the scope of my invention and that the variable-compression piston 10 may take the form of a plunger acting by displacement in manner well known in plunger-pumps for liquids. Again, the bore or the chamber $1^a$ in which the variable-compression piston or plunger 10 is adjusted may radiate out from the compression-space 11 in any desired direction. Where a single piston-rod 12 is used and the piston 10 is circular, if the nut 14 is rotated it will be necessary to prevent the turning of the piston-rod 12. In Fig. 6 I have shown means for this purpose in which the rod is splined and a key or feather 20 is set in one side of the bore of a casting 21, attached to the cylinder, which fits over the prolongation of rod 12, whereby it can slide freely without rotating. In this case the nut 14 and worm-wheel 18 may be made in a single piece and are journaled in split bearings 22, supported by the cylinder, and the shaft $16^a$ of hand-wheel 16 and its worm 19, that meshes with worm 18, may be journaled in bearings on a bracket 15, carried by the main cylinder-casting 1. Thus when wheel 16 is rotated piston 10 may be adjusted at the desired amount.

It is comparatively easy to obtain self-ignition with most mixtures of hydrocarbon vapors and air; but with the "permanent hydrocarbon gases," so called, such as ordinary coal-gas, very high compression-pressures may be obtained, and there are some mixtures of fuel-gases and air that require compression-pressure of over two hundred pounds per square inch to enable the electric spark to produce rapid inflammation. Excessive pressure of compression in ordinary gas-engines or oil-engines (where obtainable) produce very high pressures, necessitating great strength of parts and rapid wear from piston leaks. In Fig. 7 I have shown how the maximum amount of compression possible to be obtained in an internal-combustion engine with any given fuel mixture may be utilized without exceeding a substantially predetermined explosion-pressure. In said figure two power-producing pistons 2 2ª, which may be of different diameters, are shown in two cylinders 1 1ˣ, shown cast together and communicating by means of ports and passages 11ᶠ 11ᵍ, controlled by an interposed valve 22. Said valve has its upper face enlarged to form a quieting-piston and rises and falls in the socket 23 of its guide or case 24, shown held by the cover 13 in a bore in a cylinder-casting. Small grooves in the edge of the upper portion of piston 22 permit the pressure in 23 to vary with the pressure in passage 11ᵍ while the valve is seated, and so soon as the valve lifts these grooves cannot longer so act. The power-producing pistons 2 2ª and their connected parts are similar, differing only in dimensions according to the difference in the bores of the two cylinders. The connecting-rods 5 may be of the same length and connect the pistons with their respective crank-pins 3ᵇ of shaft 3; but said crank-pins are offset or located at any suitable angle with respect to each other—say at an angle of forty-five degrees—as indicated diagrammatically in dotted lines in Fig. 7. By observing the direction of the arrows in said figure it will be seen that the larger piston leads the smaller by an amount which may be anything and which is illustrated to be substantially forty-five degrees. In Fig. 7 the larger piston is shown at its extreme inner dead-point, while the smaller piston has yet a considerable distance to move before reaching its inner dead-point. At 25 is an air-intake valve communicating with a passage 26, leading to cylinder 1ˣ, and 7 indicates the exhaust-valve, all of which may be constructed and operated in any well-known manner, valve 25 communicating with the atmosphere only, so that the larger piston draws in and compresses air only, while the smaller piston draws in and compresses a mixture of fuel and air in manner described with respect to Fig. 1. Above the smaller piston 2, and adjustable up and down in the bore 1ª, is shown the variable-compression piston 10, fully described hereinabove. If now said compression-piston 10 be screwed down sufficiently to cause explosion at the proper degree of compression of the fuel and air mixture in the smaller or firing cylinder 1, the sudden rise in pressure will be sufficient to lift valve 22, and thereby a portion of the burning mixture will pass over into the compressed air behind the larger piston 2ª, thereby producing increased pressure behind the larger piston. By properly proportioning the relative diameters of the larger and smaller pistons the explosion-pressure may be kept within desired limits, although the compression-pressure is very high. The object of setting the crank of the large cylinder forward or in advance of the crank of the smaller cylinder is to permit a certain amount of premature ignition in the small cylinder without liability to stop the engine. For reasons set forth above if the variable-compression piston is adjusted to insure spontaneous explosion with a light load on the engine at the inner dead-point of the small piston when the engine is increasingly loaded the spontaneous ignition will take place more and more in advance of the inner dead-point of the small piston, and it is desirable to have the crank of the larger piston advanced far enough ahead of the smaller-piston crank to insure always enough positive turning force by reason of the pressure in the large cylinder to overcome the negative turning force in the smaller cylinder due to premature ignition. The operator by screwing in or out the variable-compression piston 10 can always keep this variation of time of ignition within desired limits.

As the valves 6 and 25 may be operated by the suction of their respective pistons or in any well-known manner and as the exhaust-valves 7 may be operated by any well-known devices or as shown in Fig. 1, I have not in Fig. 7 illustrated means for the purpose, as I do not limit myself to any particular arrangement of valves. Furthermore, the liquid fuel or a portion thereof may be ignited into the compression-space of the smaller cylinder by a pipe leading into the same, as at 26.

An engine constructed in accordance with Fig. 7 may be used as a compression, gas, or oil engine, whether of the four-cycle or two-cycle type, and said construction overcomes the difficulties found by reason of the high pressure required in the well-known Diesel motor.

My invention is not limited to the details of construction shown and described, as the same may be varied without departing from the spirit thereof.

Having now described my invention, what I claim is—

1. An internal-combustion heat-engine comprising two cylinders, one being a firing-cylinder and both provided with compression-spaces that communicate by a passage, a check-valve in the passage opening away from the firing-cylinder, pistons in said cylinders, and a shaft having cranks respectively connected with said pistons, one of said cranks being located in advance of the other so that one of the pistons will have passed its inner dead-point at the moment of ignition of a charge compressed by the other piston, substantially as described.

2. An internal-combustion heat-engine comprising two cylinders one being a firing-cylinder and both provided with compression-spaces that communicate by a passage, a check-valve in the passage opening away from the firing-cylinder, pistons in said cylinders, a shaft having cranks respectively connected with said pistons, one of said cranks being located in advance of the other so that one of the pistons will have passed its inner dead-point at the moment of ignition of a charge compressed by the other piston, and means for varying the volume of the compression-space of the fuel and air cylinder at will during operation, substantially as described.

3. An internal-combustion heat-engine comprising two cylinders in communication with each other, means for admitting fuel and air to the one cylinder and for admitting air only to the other cylinder, a check-valve controlling the passage between said cylinders and opening toward the cylinder which compresses air only, exhaust-valves communicating with said cylinders to permit the escape of the spent gases, a variable-compression piston contained in a chamber communicating with the compression-space of the fuel and air receiving cylinder, and means for adjusting said variable-compression piston and holding it in positions of adjustment, substantially as described.

JOHN L. BOGERT.

Witnesses:
T. F. BOURNE,
M. HOLLINGSHEAD.